US011506215B1

(12) United States Patent
Desmet et al.

(10) Patent No.: US 11,506,215 B1
(45) Date of Patent: Nov. 22, 2022

(54) FAN WITH AUTOMATIC THERMAL COMFORT CONTROL

(71) Applicant: Delta T, LLC, Lexington, KY (US)

(72) Inventors: James M. Desmet, Louisville, KY (US); Alex Christopher Reed, Lexington, KY (US); Richard A. Oleson, Lexington, KY (US); Marshall White, Lexington, KY (US); Jason Bishop, Nicholasville, KY (US); Richard Lenser, Lexington, KY (US); David R. Banks, Lexington, KY (US)

(73) Assignee: DELTA T, LLC, Lexington, KY (US)

( * ) Notice: Subject to any disclaimer, the term of this patent is extended or adjusted under 35 U.S.C. 154(b) by 1828 days.

(21) Appl. No.: 14/882,054

(22) Filed: Oct. 13, 2015

Related U.S. Application Data

(60) Provisional application No. 62/063,694, filed on Oct. 14, 2014.

(51) Int. Cl.
*F04D 25/08* (2006.01)
*F04D 27/00* (2006.01)
*F04D 19/00* (2006.01)

(52) U.S. Cl.
CPC ......... *F04D 27/004* (2013.01); *F04D 19/002* (2013.01); *F04D 25/088* (2013.01); *F04D 27/001* (2013.01)

(58) Field of Classification Search
CPC .... F04D 27/004; F04D 19/002; F04D 25/088; F04D 27/001
USPC .......................................................... 700/299
See application file for complete search history.

(56) References Cited

U.S. PATENT DOCUMENTS

| 4,659,290 A | 4/1987 | Kundert |
| 4,891,953 A | 1/1990 | Isono |
| 5,041,825 A * | 8/1991 | Hart ...................... G08C 17/02 454/294 |
| 5,119,987 A | 6/1992 | Kobayashi |
| 5,180,333 A | 1/1993 | Shyu |
| 5,187,472 A | 2/1993 | Hart et al. |
| 5,189,412 A | 2/1993 | Mehta et al. |
| 5,253,804 A | 10/1993 | Sarazen, Jr. et al. |
| 5,364,026 A | 11/1994 | Kundert |
| 5,372,545 A | 12/1994 | Noda et al. |

(Continued)

FOREIGN PATENT DOCUMENTS

| JP | 2007623088 A | 10/2007 |
| JP | A2007263088 | 10/2007 |

(Continued)

OTHER PUBLICATIONS

Non-Final Office Action dated Jul. 6, 2018 for U.S. Appl. No. 15/300,844, filed Sep. 30, 2018.

(Continued)

*Primary Examiner* — Michael W Choi
(74) *Attorney, Agent, or Firm* — Dickinson Wright, PLLC; Andrew D. Dorisio (57) ABSTRACT

An apparatus for circulating air in a space using a fan, a sensor for sensing an ambient condition, and a user input for inputting a desired condition. A controller is configured for controlling the fan to operate substantially at a first fan speed for the desired condition, and controlling the fan to operate substantially at a second fan speed for the sensed ambient condition. Related methods are also disclosed.

10 Claims, 9 Drawing Sheets

(56) References Cited

U.S. PATENT DOCUMENTS

| | | | |
|---|---|---|---|
| 5,385,297 A | 1/1995 | Rein et al. | |
| 5,449,112 A | 9/1995 | Heitman et al. | |
| 5,449,275 A | 9/1995 | Gluszek et al. | |
| 5,528,229 A * | 6/1996 | Mehta | F24D 25/088 |
| | | | 454/258 |
| 5,627,527 A * | 5/1997 | Mehta | F04D 25/088 |
| | | | 340/12.5 |
| 5,701,117 A | 12/1997 | Platner et al. | |
| 5,810,244 A | 9/1998 | Ngai | |
| 5,857,906 A | 1/1999 | Cho | |
| 5,996,898 A | 12/1999 | Parker et al. | |
| 6,155,341 A | 12/2000 | Thompson et al. | |
| 6,294,874 B1 | 9/2001 | Rudolph et al. | |
| 6,415,984 B1 | 7/2002 | Parker et al. | |
| 6,651,895 B1 | 11/2003 | Kadle et al. | |
| 6,669,101 B2 | 12/2003 | Ichishi et al. | |
| 6,792,319 B1 | 9/2004 | Bilger | |
| 6,909,921 B1 | 6/2005 | Bilger | |
| 6,912,429 B1 | 6/2005 | Bilger | |
| 7,346,440 B2 | 3/2008 | Ichishi et al. | |
| 7,392,662 B2 | 7/2008 | Gao | |
| 7,571,865 B2 | 8/2009 | Nicodem et al. | |
| 7,665,319 B2 | 2/2010 | Hsieh et al. | |
| 7,690,583 B2 | 4/2010 | Cherewatti et al. | |
| 7,747,246 B2 | 6/2010 | Zellner et al. | |
| 8,195,313 B1 | 6/2012 | Fadell et al. | |
| 8,233,890 B2 | 7/2012 | Zellner et al. | |
| 8,364,318 B2 | 1/2013 | Grabinger et al. | |
| 8,374,725 B1 | 2/2013 | Ols | |
| 8,510,255 B2 | 8/2013 | Fadell et al. | |
| 8,526,925 B2 | 9/2013 | Zellner et al. | |
| 8,543,244 B2 | 9/2013 | Keeling et al. | |
| 8,558,179 B2 | 10/2013 | Filson et al. | |
| 8,560,128 B2 | 10/2013 | Ruff et al. | |
| 8,571,518 B2 | 10/2013 | Imes et al. | |
| 8,594,850 B1 | 11/2013 | Gourlay et al. | |
| 8,606,374 B2 | 12/2013 | Fadell et al. | |
| 8,620,841 B1 | 12/2013 | Filson et al. | |
| 8,626,344 B2 | 1/2014 | Imes et al. | |
| 8,900,041 B2 | 12/2014 | Toy | |
| 9,158,311 B2 * | 10/2015 | Geissler | G05D 23/1932 |
| 2001/0048279 A1 * | 12/2001 | Beifus | H02P 6/08 |
| | | | 318/400.12 |
| 2003/0225480 A1 | 12/2003 | Liu et al. | |
| 2003/0225542 A1 | 12/2003 | Liu et al. | |
| 2005/0115258 A1 * | 6/2005 | Violand | F24F 1/027 |
| | | | 62/158 |
| 2005/0125083 A1 | 6/2005 | Kiko | |
| 2009/0014545 A1 | 1/2009 | Horiuchi | |
| 2010/0215510 A1 | 8/2010 | Tsai et al. | |
| 2010/0291858 A1 * | 11/2010 | Toy | F04D 25/088 |
| | | | 454/258 |
| 2011/0010014 A1 | 1/2011 | Oexman et al. | |
| 2011/0264273 A1 | 10/2011 | Grabinger et al. | |
| 2011/0264275 A1 | 10/2011 | Thomle et al. | |
| 2011/0264280 A1 | 10/2011 | Grabinger et al. | |
| 2011/0274561 A1 * | 11/2011 | Kobayashi | F04D 25/088 |
| | | | 417/14 |
| 2011/0313579 A1 | 12/2011 | Ling | |
| 2012/0125592 A1 | 5/2012 | Fadell et al. | |
| 2012/0179300 A1 | 7/2012 | Warren et al. | |
| 2012/0239221 A1 | 9/2012 | Mighdoll et al. | |
| 2012/0255720 A1 * | 10/2012 | Miller | G05D 23/1931 |
| | | | 236/49.3 |
| 2012/0316687 A1 | 12/2012 | Chen et al. | |
| 2013/0024799 A1 | 1/2013 | Fadell et al. | |
| 2013/0099009 A1 | 4/2013 | Filson et al. | |
| 2013/0099010 A1 | 4/2013 | Filson et al. | |
| 2013/0103207 A1 | 4/2013 | Ruff et al. | |
| 2013/0173064 A1 | 7/2013 | Fadell et al. | |
| 2013/0211783 A1 | 8/2013 | Fisher et al. | |
| 2013/0226354 A9 | 8/2013 | Ruff et al. | |
| 2013/0238160 A1 | 9/2013 | Imes et al. | |
| 2013/0263034 A1 | 10/2013 | Bruck et al. | |
| 2013/0297555 A1 | 11/2013 | Fadell et al. | |
| 2013/0332000 A1 | 12/2013 | Imes et al. | |
| 2014/0027645 A1 | 1/2014 | Filson et al. | |

FOREIGN PATENT DOCUMENTS

| | | |
|---|---|---|
| JP | 2010242626 A | 10/2010 |
| JP | 201112550 A | 6/2011 |
| JP | 2011122550 A | 6/2011 |
| JP | 2017511438 | 4/2017 |
| WO | 2015153604 A1 | 10/2015 |

OTHER PUBLICATIONS

Final Office Action dated Jan. 30, 2019 for U.S. Appl. No. 15/300,844, filed Sep. 30, 2018.

Non-Final Office Action dated Aug. 16, 2019 for U.S. Appl. No. 15/300,844, filed Sep. 30, 2018.

Final Office Action dated Feb. 19, 2020 for U.S. Appl. No. 15/300,844, filed Sep. 30, 2018.

Notice of Allowance dated Apr. 7, 2020 for U.S. Appl. No. 15/300,844, filed Sep. 30, 2018.

English Abstract of JP2010242626 dated Oct. 28, 2010.

English Abstract of JP201112550 dated Jun. 23, 2011.

English Abstract of JP2007623088 dated Oct. 11, 2007.

* cited by examiner

FAN WITH AUTOMATIC THERMAL COMFORT CONTROL

This application claims the benefit of U.S. Provisional Patent Application Ser. No. 62/063,694, the disclosure of which is incorporated herein by reference.

TECHNICAL FIELD

This application relates generally to the air handling arts and, more particularly, to a fan with automatic thermal comfort control.

BACKGROUND OF THE INVENTION

Fans may incorporate temperature sensors to provide a measure of an ambient condition, such as temperature in a space in which the fan is located, in order to regulate the operation of the fan. Of course, the temperature may be subject to wide variability, and it would be desirable for the fan speed to adjust accordingly in order to ensure that comfort is maximized over a range of conditions. Merely adjusting the fan speed based on sensed temperature or other conditions also does not account for the fact that the user's preferences for a particular fan speed based on the temperature are not taken into consideration during the operation. For example, a fan speed that one user finds comfortable at one temperature may not be comfortable for that same user when regulated in a lock-step fashion to a different temperature, or for a different user.

Accordingly, a need is identified for a solution that may address the foregoing limitations, and possibly others that are not identified.

SUMMARY

According to a first aspect of the disclosure, an apparatus for circulating air in a space comprises a fan, a sensor for sensing an ambient condition, and a user input for inputting a desired condition (e.g., fan speed or temperature). A controller is configured for controlling the fan to operate substantially at a first fan speed for the desired condition and, based on the desired condition, calculating a second fan speed for the sensed ambient condition.

In one embodiment, a wall controller is provided for controlling the fan, the wall controller including the at least one sensor. Alternatively, the fan may include the at least one sensor, and may also include the controller. A mobile computer may also be provided, which may be used for providing the user input.

The ambient condition may comprise temperature or humidity. The inputted condition may include a desired temperature, and the controller may be operative to adapt the desired temperature to a new temperature based on a user-inputted fan speed at a sensed temperature. The controller may also be adapted to receive a maximum fan speed and a minimum fan speed, and to determine a scaled control value for determining a fan operating speed based on the difference between an effective temperature and a desired temperature. Based on a user-inputted fan speed as the desired condition, the controller may be operative to adjust a temperature range over which the fan goes from a first lower fan speed to a second higher fan speed.

According to another aspect of the disclosure, a method of controlling a fan is provided. The method may comprise providing a user input for inputting a first desired speed as a condition of operation for the fan at a first ambient condition and calculating a fan speed for a second ambient condition based on the first desired speed at the first ambient condition. The method may further include the step of providing the user input for inputting a second desired speed for the fan at a third ambient condition, and the calculating step comprises determining the fan speed based on the second ambient condition and the third ambient condition.

A further aspect of the disclosure pertains to a method of providing a fan. The method comprises providing the fan with a first operating speed for a first ambient condition and a second operating speed for a second ambient condition. The method further comprises providing an input for inputting a desired fan speed, and determining a third ambient condition associated with the desired fan speed. The method further includes the step of determining whether to adjust the first operating speed or the second operating speed based on the desired fan speed and the third ambient condition.

In one embodiment, the step of determining whether to alter or adjust the first operating speed or the second operating speed comprises: (1) determining an ambient temperature associated with the desired fan speed; and (2) adjusting the first operating speed, the second operating speed, or both the first and second operating speeds based on the desired fan speed at the determined ambient temperature. The method may further include the step of adjusting an entire range of fan speeds based on the desired fan speed at the determined ambient temperature.

The adjusting step may comprise: (1) determining whether the desired fan speed corresponds to a minimum speed of the fan; and (2) replacing the first speed value with a new speed value corresponding to a lower speed and a lower temperature. The adjusting step may comprise: (1) determining whether the desired fan speed corresponds to a maximum speed of the fan; and (2) replacing the second speed value with a new speed value corresponding to a higher speed and a higher temperature. The adjusting step may comprise determining whether the desired fan speed does not correspond to a maximum speed or a minimum speed, and then (1) adjusting the first operating speed if the ambient temperature is less than a first temperature value associated with the first operating speed; and (2) adjusting the second operating speed if the ambient temperature is greater than a second temperature value associated with the second operating speed.

Yet a further aspect of the disclosure pertains to a method of operating a fan. The method comprises determining an operating speed for the fan based on a user-defined ideal temperature, maximum speed, and minimum speed. The determining step may comprise determining a scaled control value for determining the operating speed based on the difference between an effective temperature and the user-defined ideal temperature. The method may further include the step of adjusting the user-defined maximum speed or the user-defined minimum speed.

A further aspect of the disclosure pertains to a method of controlling a fan speed. The method comprises providing a first user input corresponding to a first desired speed for the fan based on a first ambient condition; providing a second user input corresponding to a second desired speed for the fan at a second ambient condition; and calculating a fan speed for a third ambient condition, including based on the first and second desired speeds at the first and second ambient conditions. The providing steps may comprise providing the first and second user inputs on a common user interface, and the first and second ambient conditions may be substantially the same. The first user may input the first desired speed prior in time to the second user inputting the second desired speed.

This disclosure also relates to a method for regulating the operation of a fan. The method comprises controlling a speed of the fan based on a sensed temperature. Based on a user input, the method further includes adjusting a temperature range over which the fan goes from a first lower fan speed to a second higher fan speed. The adjusting step may comprise adjusting the temperature range to include a first temperature value at a minimum fan speed corresponding to the first lower fan speed and a second temperature value at a maximum fan speed corresponding to the second higher fan speed.

DETAILED DESCRIPTION

Figure 1:
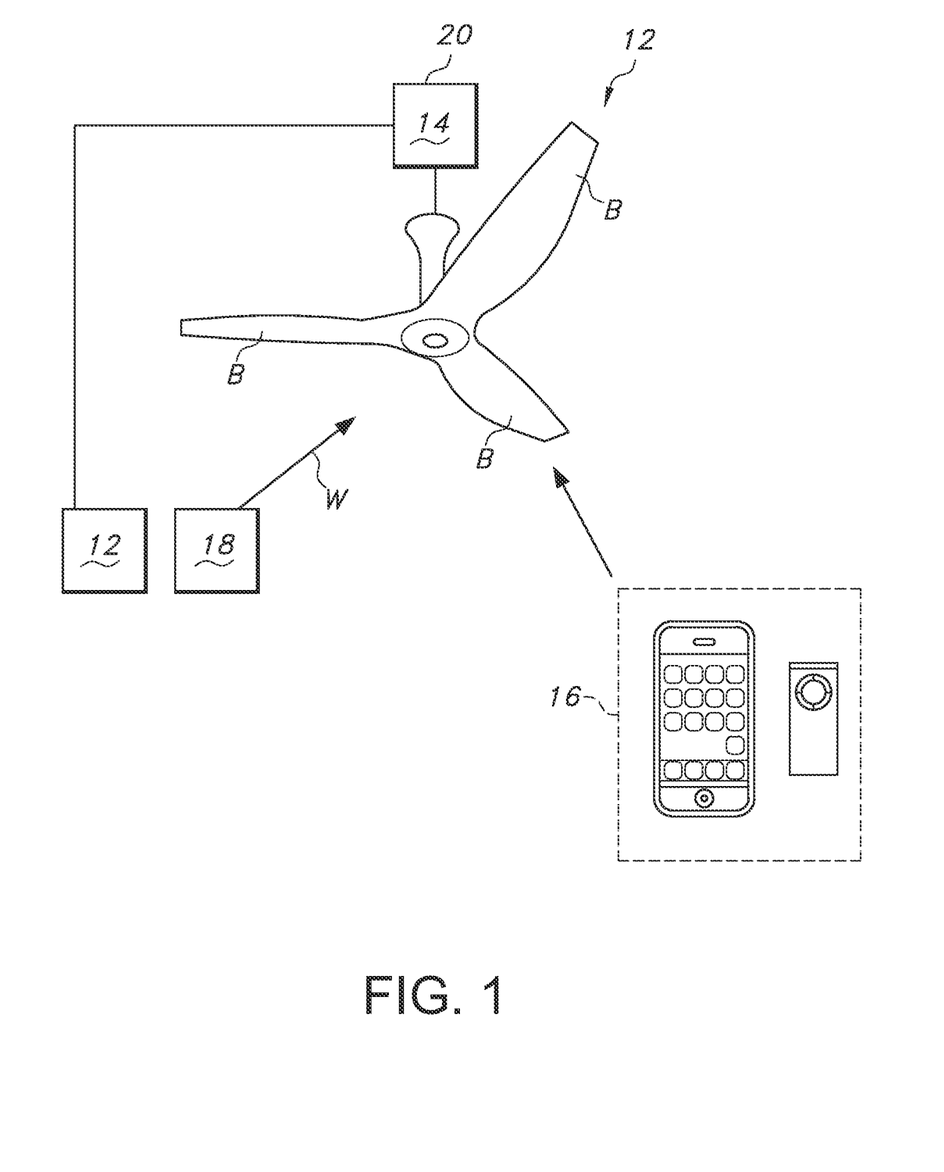
FIG. 1 illustrates a possible environment of use associated with the disclosure.

Reference is now made to FIG. 1, which schematically illustrates one possible embodiment of a fan 10 according to the present disclosure. The fan 10 may comprise any type of fan, such as for example an overhead ceiling fan including a plurality of blades B actuated by an associated motor (usually internal to the fan housing, and indicated schematically in FIG. 9), The operation of the fan and, in particular, the speed at which it is caused to operate (such as by the motor rotating the fan blades B) may be controlled by a controller 14.

At least one sensor 12 may be provided to detect an ambient condition, either at the fan location or at a location remote from the fan itself (i.e., not at the precise location where the fan is positioned or within part of the fan itself 10, which may involve transmission of the signal to the fan 10 or controller 14 in particular, which can be done via wireless transmitter 18, such as a Wi-Fi radio). For example, the sensor 12 may comprise a temperature sensor, which may be part of the fan 10, and may include a sensor for sensing the remote temperature (e.g., a PIR sensor arrangement). The sensed temperature may be used by a controller 14 to control the fan 10, such as by activating it, deactivating it, or otherwise regulating its speed of operation.

In one aspect of the disclosure, a user input 16 allows a user to input a fan speed (or an ideal temperature, as discussed below) during a learning mode of operation (as contrasted with an automatic mode where the fan speed may be regulated independent of any user input in relation to desired speed). The input 16 may comprise a wired or wireless remote control, and may be provided by way of a user-specific input device, such as a "smart" phone, tablet, computer, or the like, running associated software for communicating the desired value to the fan controller 14 in recognizable form. In this learning mode, the user inputted speed is recorded in a memory 20 (which may be associated with controller 14) and stored, along with a sensed temperature associated with the user input. This recording may be done during an initialization of the fan 10 once installed, or later when a learning mode of operation is selected by the user via the input 16.

Figure 2:
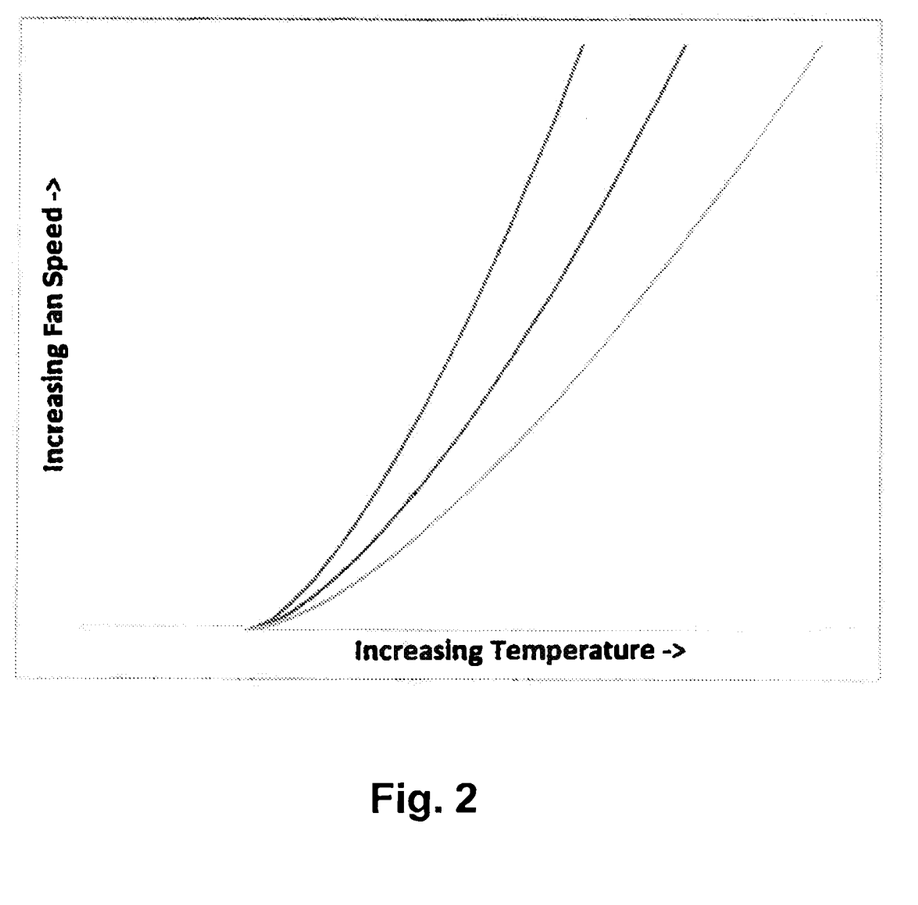
FIGS. 2 and 3 illustrate the effect of various control values on the relationship of fan speed and temperature.
Figure 3:
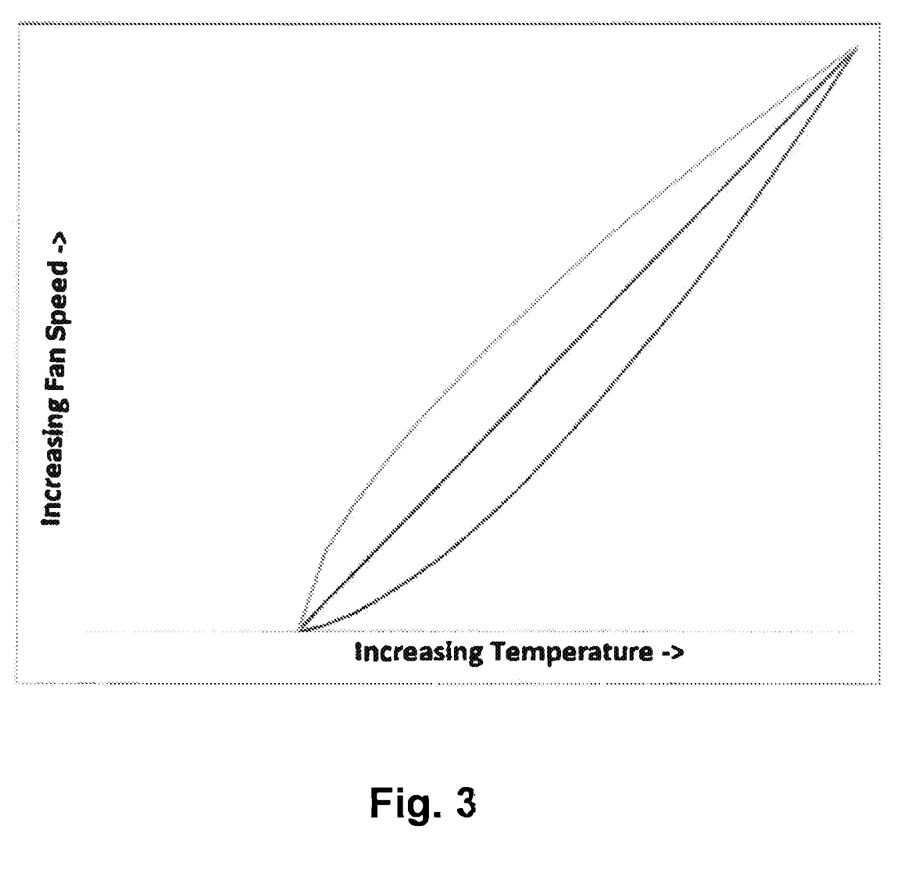
Figure 4:
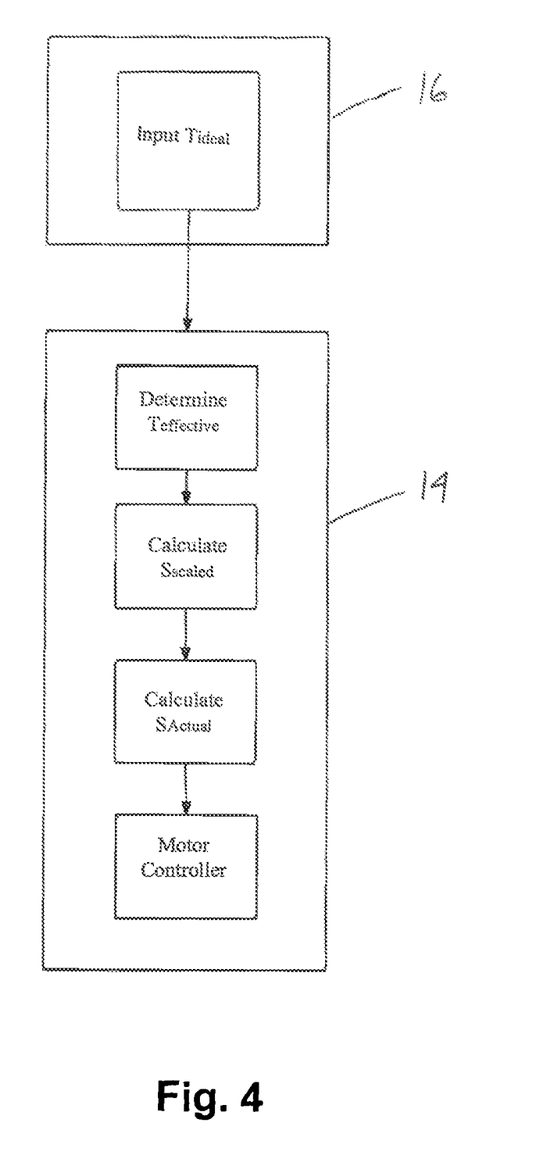
FIG. 4 is a flow chart illustrating the user input of an ideal or desired temperature and the determination of a scaling factor for regulating the fan speed.

Based on the user selected speed for a given temperature, the controller 14 may regulate the operation of the fan 10 based on increases or decreases in temperature from the initial value. With reference to FIGS. 2 and 3, the control may be done in a manner such that the speed is regulated in order to ensure that comfort is attained based on the sensed temperature and humidity of a given space. In this embodiment, the controller 14 calculates a fan speed based on the current temperature and humidity of the space that the fan 10 occupies, as well as a user-defined desired or ideal temperature (which may be provided via input 16; see FIG. 4). The following equation uses the measured temperature and humidity as a combined value referred to as the "effective temperature" of the space to make speed adjustments to the fan 10:

$$S_{Scaled}=A_{Control}*(T_{Effective}-T_{Ideal})^{P_{Control}}$$

The value $S_{scaled}$ represents the desired scaled output fan speed, which may be calculated using the above formula. In one implementation, values less than 0.0 are constrained to be 0.0, and values above 1.0 are constrained to be 1.0. A result value of 0.0 indicates that the fan should run at the minimum desired speed (which may be off, but not necessarily). A result value of 1.0 indicates that the fan should run at the maximum desired speed (which may be the maximum speed of the fan, but not necessarily).

The value $A_{Control}$ may be used to adjust the temperature range over which the fan goes from minimum speed to maximum speed. FIG. 2 shows the effect of different values of $A_{control}$ on the resulting speed curve.

The value $T_{effective}$ represents the effective temperature created by combining the actual measured temperature and humidity. The value $T_{ideal}$ represents the user defined ideal temperature. As outlined further in the description that follows, the ideal temperature value can change as new values are learned based on user feedback, such as pertaining to fan speed, and provided by input 16.

The value $P_{Control}$ is a fixed value used to adjust the shape of the resulting curve. A value of 1.0 would cause the fan response in terms of speed to be perfectly linear. Other values cause the response to speed up more or less aggressively as the effective temperature increases. FIG. 3 shows how the speed curve is altered when $P_{Control}$ is adjusted. An exemplary value for $P_{Control}$ that has been found to be effective is 1.5, but other values may be used depending on the desired results. Furthermore, it is possible to alter the value of $P_{Control}$ based on user feedback.

The calculation for $S_{scaled}$ may be performed periodically (such as once per minute, which prevents undesirable oscillations in the fan speed). Upon completion, and with reference to FIG. 4, the calculated value is then fed into another equation to determine actual fan speed, shown here:

$$S_{actual}=S_{scaled}*(S_{max}-S_{min})+S_{min}$$

The value $S_{max}$ represents the speed (in RPM) of the user's maximum desired speed point. The user can choose for this value to be the maximum of the fan itself, or some lower value if allowing the fan to run that fast is not desired. The value $S_{min}$ represents the speed (in RPM) of the user's minimum desired speed point. The user can choose for this value to be the minimum of the fan itself (i.e., off), or some higher value if allowing the fan to stop is not desired. The value $S_{actual}$ represents the actual desired fan speed (in RPM). This value is used by the control 14 as the new desired speed set point for the fan 10.

Figure 5:
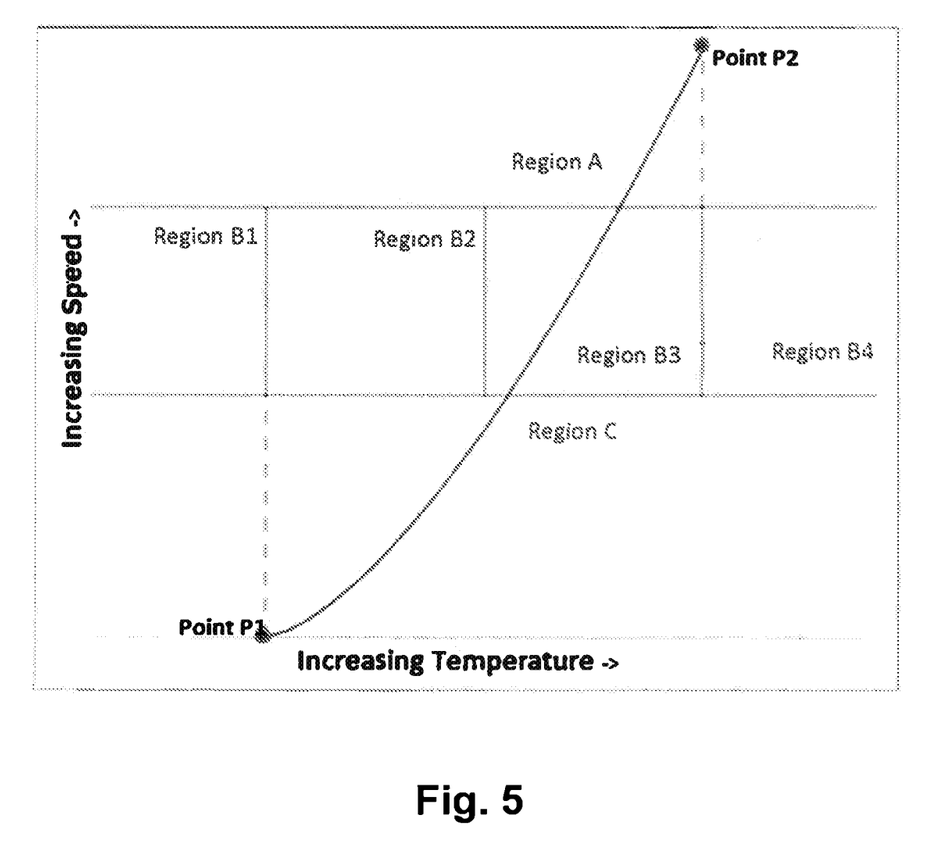
FIG. 5 is a graphical representation illustrating how a range of temperatures over which fan speeds are regulated may be determined.

According to a further aspect of the disclosure, and with reference to FIGS. 5-8, the control may also be adapted to learn user preferences and modify the fan operation accordingly. For instance, the control may track two points on the speed curve. FIG. 5 shows a representation of the speed curve with the two points labeled as point P1 and point P2. The control maintains a point P1 such that it represents the minimum fan speed at the ideal or desired temperature, and also point P2 such that it represents the maximum fan speed at the corresponding temperature.

The learning mode may be used to convert user feedback into usable data for the control. This feedback may be provided by the user by either adjusting the fan speed or the ideal temperature (such as by using a remote control, which may include software (e.g., a "smartphone" application), as indicated by input 16 in FIGS. 1 and 4). Adjusting the fan speed indicates to the learning mode that the current speed is incorrect for the current effective temperature. The control will decide how to modify the control data variables based on the final user speed selection and current effective temperature. As described below, the control first determines which of the two points to replace. Then, the control will perform all necessary calculations to generate new control data.

As noted, it is possible to directly adjust the ideal temperature value. This indicates to the learning mode that it should replace the lower temperature, shown as point P1 in FIG. 5, with a new point at the given ideal temperature and minimum fan speed. The control may then perform all necessary calculations to generate new control data.

Figure 6:
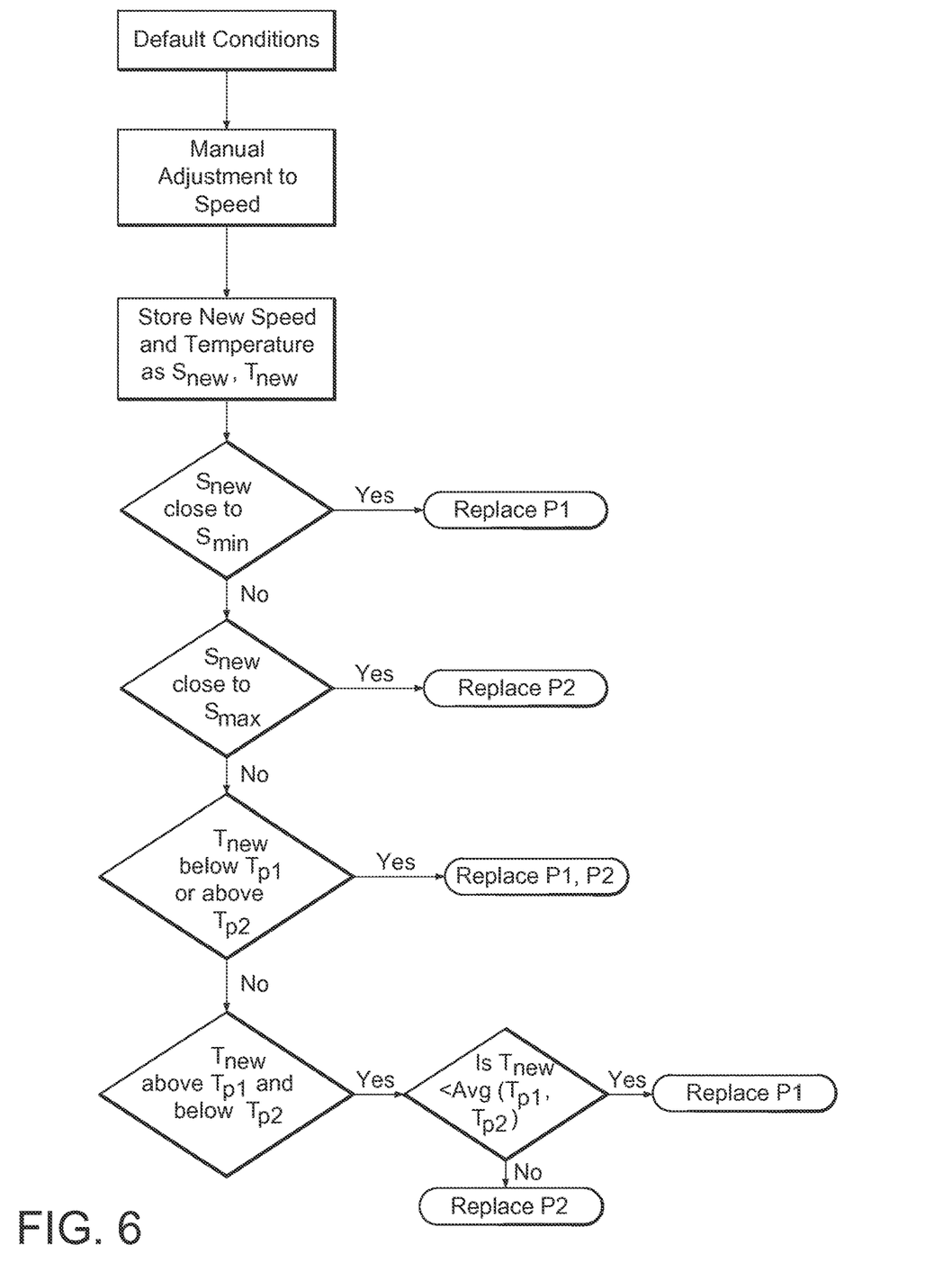
FIGS. 6-8 are flow charts illustrating the logic associated with determining how to replace one or more values associated with the range based on a user inputted condition of operation.

The fan 10 (or controller 14 in particular) may initially be provided with a default operating condition pertaining to a range of speeds for a given range of temperatures. When the fan controller 14 is given a new data point by a manual adjustment to the fan speed (such as via user input 16), the new temperature and speed are stored as values, $T_{New}$ and $S_{New}$ respectively. It is then necessary to determine which of the two existing control points, or if both, should be replaced. As indicated in FIG. 6, the operation of replacing a point is performed by altering its associated temperature value to the newly captured $T_{New}$ value, and altering its associated speed value to $S_{New}$.

When $S_{New}$ is close to the minimum speed of the fan, shown as region C in FIG. 5, the control will replace point P1. When $S_{New}$ is close to the maximum speed of the fan, shown as region A in FIG. 7, the control will replace point P2. If $S_{New}$ is not close to either the minimum or the maximum, then $T_{New}$ is used to determine which point or points to replace. If $T_{New}$ is below the $T_{P1}$, shown as region B1 in FIG. 5, or above $T_{P2}$, shown as region B4, then both P1 and P2 will be replaced ($T_{P1}$ is the temperature of point P1, $T_{P2}$ is the temperature of point P2, $S_{P1}$ is the scaled fan speed of point P1, and $S_{P2}$ is the scaled fan speed of point P2). If $T_{New}$ is above $T_{P1}$, but below $T_{P2}$, then one more check is needed to determine how to process the data. If $T_{New}$ is less than the average of $T_{P1}$ and $T_{P2}$, shown as region B2 in FIG. 5, then the new data replaces P1. Otherwise, the new data falls into region B3 in FIG. 5, and the new data replaces P2.

Figure 7:
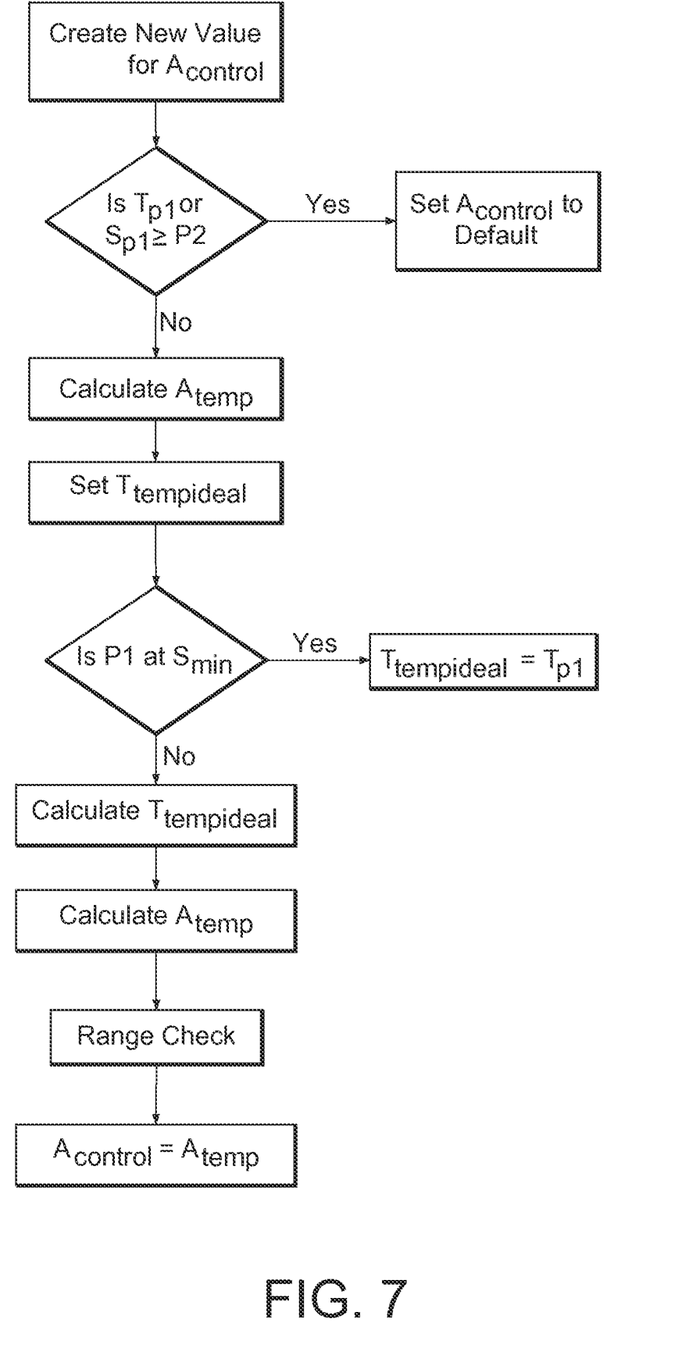

Once the appropriate point or points have been replaced, the control data values must be updated. This includes creating new values for point P1 and point P2 such that they are ideally positioned again. With reference to FIG. 7, the first step of creating new control data is calculating the new value for $A_{Control}$. If either the temperature or fan speed of point P1 is greater than or equal to point P2, then the adjustment was extreme, and a default value for $A_{Control}$ is used (e.g., 0.216). Otherwise, a new temporary value of $A_{Control}$, called $A_{Temp}$, needs to be calculated mathematically.

Before $A_{Temp}$ can be calculated, a new temporary ideal temperature, called $T_{TempIdeal}$, must be created. If point P1 is at the minimum fan speed, then $T_{TempIdeal}$ is $T_{P1}$. Otherwise, $T_{TempIdeal}$ must be calculated. In order to make the $T_{TempIdeal}$ calculation, an intermediate $S_{Ratio}$ value is calculated according to the following formula:

$$S_{Ratio} = \left(\frac{S_{P2}}{S_{P1}}\right)^{\frac{1.0}{P_{Control}}}$$

$$T_{TempIdeal} = \frac{S_{Ratio} * T_{P1} - T_{P2}}{S_{Ratio} - 1.0}$$

The value of $A_{Temp}$ can be calculated from $T_{TempIdeal}$.

$$A_{Temp} = \frac{S_{P2}}{(T_{P2} - T_{TempIdeal})^{P_{Control}}}$$

The $A_{Temp}$ value is now range checked (e.g, if it is between two arbitrary values designed to confine the temperature range, such as for example 0.075 and 0.333; other values may of course be used depending on the particular application). If $A_{Temp}$ is too small, too large of a temperature change would be required for a speed change, so $A_{Temp}$ is replaced with a minimum value. If $A_{Temp}$ is too large, a small temperature change would result in a large speed change, so $A_{Temp}$ is replaced with a maximum value. Once the range check is complete, the $A_{Control}$ value is given the value of $A_{Temp}$.

Figure 8:
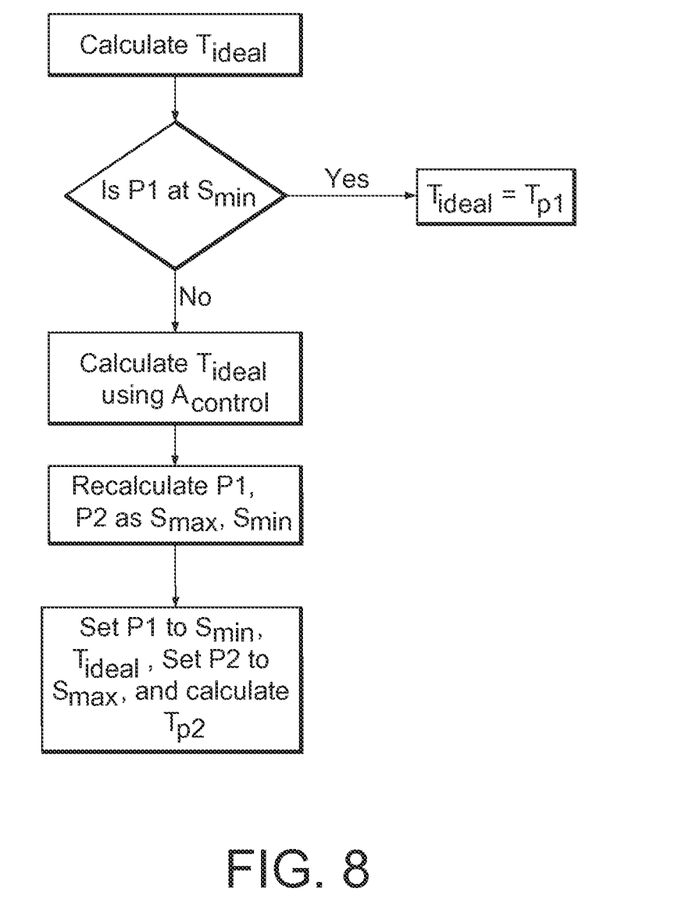

After the new $A_{Control}$ value is assigned, a $T_{Ideal}$ must be calculated. As indicated in FIG. 8, if point P1 is at the minimum fan speed, then $T_{Ideal}$ is $T_{P1}$. Otherwise, $T_{Ideal}$ must be calculated using the new $A_{Control}$ value.

$$T_{Ideal} = T_{new} - e^{\left(\frac{\ln\left(\frac{S_{New}}{A_{Control}}\right)}{P_{Control}}\right)}$$

The control data has now been calculated. At this point, the control recalculates point P1 and point P2 so as to represent the minimum and maximum speed points. Point P1 fan speed is set to the minimum, and the temperature is set to $T_{Ideal}$. Point P2 fan speed is set to the maximum, and the temperature is set to the result of this equation:

$$T_{P2} = T_{Ideal} + e^{\left(\frac{\ln\left(\frac{1.0}{A_{Control}}\right)}{P_{Control}}\right)}$$

The control is then operational according to the updated control values until a further user adjustment is made.

Figure 9:
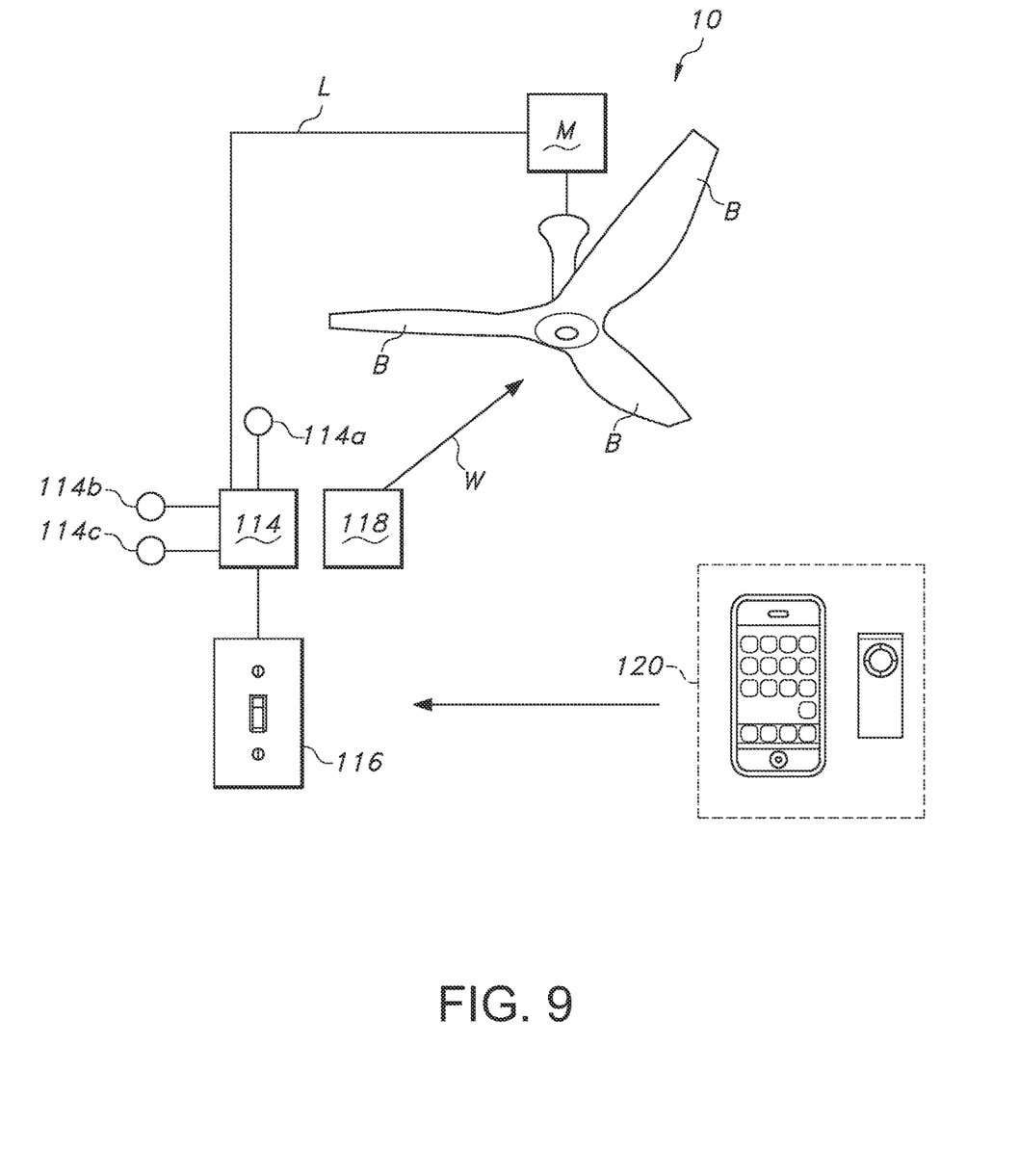
FIG. 9 illustrates another possible environment of use.

Turning to FIG. 9, the control may be implemented in connection with a wall controller, such as a switch 116, may include a controller 114 associated with one or more sensors for sensing conditions at the location of the switch. This location of the switch 116 may be in the same room or space as the fan 10 but is considered to be remote therefrom in the sense that it is not physically attached to the fan (despite being in communication via wire or wireless means, as discussed below). The sensor or sensors may be selected from the group consisting of a temperature sensor 114a, a humidity sensor 114b, an occupancy sensor 114c, or any combination thereof. The temperature and occupancy sensors 114a, 114c, if present, may be of the type using infrared energy to detect temperature or occupancy at a location remote from the fan itself (i.e., anywhere outside of the fan 10 in the corresponding space where the air conditions are regulated by the fan). The sensed condition may then be used by a controller 114 associated with the fan 10 to control its operation, such as by activating it, deactivating it, or otherwise regulating its speed of operation.

In one particular embodiment, the transmittal of the condition (including possibly relating to the "on" condition of the fan or its speed of operation, as determined by the mechanical adjustment of the switch 116) is performed by the switch 116. This may be done in several manners. For one, it may be achieved by transmitting control signals for controlling the fan 10 over the circuitry used to supply power to both the fan 10 (including an associated light) and the switch 116, such as conventional AC wiring. The controller 114 for controlling the fan 10 may in this instance communicate with an AC induction motor M for causing movement of the associated fan blades B. This connection is represented by line L in the figure. As can be appreciated, this allows for the switch 116 including the sensor technology disclosed herein to be used in connection with existing fans, thereby allowing for a retrofit situation (that is, the switch may be installed and used to control an existing fan present on the same circuit).

Alternatively or additionally, the transmission of data regarding the sensed conditions may be done wirelessly. Specifically, the switch 116 is associated via controller 114 with a wireless transmitter 118, such as a Wi-Fi radio, for transmitting the operational (including state or speed) or sensed conditions. The transmission may be directly to a receiver associated with the fan controller 114, which may be within an associated housing of the fan 10. This is indicated by line W in the figure.

The switch 116 may also be adapted for control using an intermediate device, such as a handheld controller 120 separate from the fan 10 (e.g., a smart phone, tablet, remote control, or the like). The handheld controller 120 may issue control signals to the controller 114 associated with the switch 116, such as for controlling the on/off state of the fan 10 or an associated light (including possibly as part of an alarm clock or sleep function, according to a particular schedule determined by the user, and may also operate in connection with a learning mode, as described above). The switch 116 may then send signal(s) to the fan controller 118 to regulate the operation of the fan 10 in accordance with the instructions provided by the handheld controller 120.

Thus, in one example of use, the operation of the fan 10 may be regulated by the switch 116. For example, a user turning the switch 116 to the on position would result in a signal being generated to activate the fan 10 and cause it to rotate at a pre-determined speed. The sensor(s) 114a, 114b, 114c may then be used to regulate the operation of the fan 10 based on the output of the sensor(s), including in accordance with pre-determined algorithms based on desired speed for a given condition or conditions (which as noted above may be user-defined). Specifically, the fan 10 may be actuated based upon the sensing of a remote temperature at a pre-determined level, or may be de-activated once actuated (including by a user, and not necessarily as the result of an automated event) once a remotely sensed temperature reaches a pre-determined level.

Alternatively or additionally, the switch 116 may operate to regulate the fan 10 by obtaining information regarding an actual temperature sensed based on the user input. Thus, if for example a user selects "speed 2" on a three speed switch, the switch 116 may via control 114 take note of the conditions (temperature, humidity, or both), and then provide for automatic regulation of the fan operation in the future based on the sensed conditions (e.g., adjusting the speed (anywhere between zero and a pre-determined maximum speed) based on a sensed change in conditions), including as described in the above-referenced embodiments relating to a learning mode of operation (that is, the adjustment of the switch 116 may be the user-selected speed that drives the learning algorithm). Aside from or in addition to activation and de-activation, it is also possible to regulate the speed of the fan 10 according to the sensed temperature or humidity, such as based on a pre-determined or user-inputted set point value, and also to regulate the fan operation based on actual or predicted occupancy. Adjustments to the operation controlled by the switch 116 may also be made by the user via the remote controller 120.

As can be appreciated, the control may also be adapted for use in connection with different users. For instance, a first user input 16 may be provided for allowing a first user to input a first desired speed for the fan based on a first ambient condition, such as temperature. The same user input (or a different one) may be used to allow a second user to input a second desired speed for the fan at a second ambient condition (which may be the same as the first ambient condition, or may be different). A fan speed for a third ambient condition may then be determined, including based on the first and second desired speeds at the first and second ambient conditions.

Having shown and described various embodiments, further adaptations of the apparatuses, methods and systems described herein may be accomplished by appropriate modifications by one of ordinary skill in the art without departing from the scope of the disclosure. Several of such potential modifications have been mentioned, and others will be apparent to those skilled in the art. For instance, the examples, embodiments, geometries, materials, dimensions, ratios, steps, and the like discussed above are illustrative and are not required. Terms like "substantially" or "about" may be considered to allow for variance from any strict value or condition, such as for example 10% or a change that would not impact the ability of the invention to operate in the intended manner. Accordingly, the scope of the disclosure should be considered in terms of claims that may be presented, and is understood not to be limited to the details of structure and operation shown and described in the specification and drawings.

The invention claimed is:

1. An apparatus for circulating air in a space, comprising:
a fan;
a sensor for sensing an ambient condition;
a user input for inputting a desired condition; and a controller configured for controlling the fan to operate substantially at a first fan speed for the desired condition, based on the desired condition, calculating a second fan speed for the sensed ambient condition, wherein the second fan speed is calculated by the equation:

$$S_{actual} = S_{scaled} * (S_{max} - S_{min}) + S_{min}$$

wherein $S_{actual}$ is the second fan speed, $S_{scaled}$ is a value between 0 and 1 comprising a desired scaled output fan speed, said value being a function of a difference between the ambient condition and the desired condition, $S_{max}$ is a maximum allowed fan speed, and $S_{min}$ is a minimum allowed fan speed; and operating the fan at the second fan speed at the sensed ambient condition.

2. The apparatus of claim 1, further including a wall controller for controlling the fan, the wall controller including the sensor.

3. The apparatus of claim 1, wherein the fan includes the sensor.

4. The apparatus of claim 1, further including a mobile computer for providing the user input.

5. The apparatus of claim 1, wherein the fan includes the controller.

6. The apparatus of claim 1, wherein the ambient condition comprises temperature or humidity.

7. The apparatus of claim 1, wherein the inputted condition includes a desired temperature, and the controller is operative to adapt the desired temperature to a new temperature based on a user-inputted fan speed at a sensed temperature.

8. The apparatus of claim 1, wherein the inputted condition includes a desired temperature, and the controller is adapted to receive a maximum fan speed and a minimum fan speed, and to determine a scaled control value for determining a fan operating speed based on the difference between an effective temperature and a desired temperature.

9. The apparatus of claim 1, wherein, based on a user-inputted fan speed as the desired condition, the controller is operative to adjust a temperature range over which the fan goes from a lower fan speed to a higher fan speed.

10. A method of operating a fan, comprising:

determining an operating speed for the fan based on a user-defined ideal temperature, maximum speed, and minimum speed, wherein the determining step comprises calculating a scaled control value for determining the operating speed based on the difference between an effective temperature and the user-defined ideal temperature, and calculating the operating speed based on a function of the scaled control value multiplied by a difference between the maximum speed and the minimum speed;

controlling the fan to operate at the operating speed; and adjusting the user-defined maximum speed or the user-defined minimum speed.

* * * * *